(12) United States Patent
Zhadanov

(10) Patent No.: US 8,292,253 B2
(45) Date of Patent: Oct. 23, 2012

(54) DEVICE FOR SUPPORTING BATHROOM ACCESSORIES AND THE LIKE

(76) Inventor: Eli Zhadanov, Brooklyn, NY (US)

(*) Notice: Subject to any disclaimer, the term of this patent is extended or adjusted under 35 U.S.C. 154(b) by 0 days.

(21) Appl. No.: 10/418,581

(22) Filed: Apr. 19, 2003

(65) Prior Publication Data

US 2004/0206867 A1    Oct. 21, 2004

(51) Int. Cl.
*A47G 29/00* (2006.01)

(52) U.S. Cl. .......... 248/683; 248/205.3; 248/205.5; 248/363; 4/559; 4/605

(58) Field of Classification Search .......... 248/205.5, 248/205.6, 206.3, 205.8, 206.2, 363, 683, 248/205.3, 223.31; 4/559, 605
See application file for complete search history.

(56) References Cited

U.S. PATENT DOCUMENTS

| | | | | |
|---|---|---|---|---|
| 2,968,460 A * | 1/1961 | Van Dusen | ............... | 248/205.3 |
| 3,659,319 A * | 5/1972 | Erickson | ..................... | 24/304 |
| 3,750,991 A * | 8/1973 | Ragir | .................... | 248/205.8 |
| 3,809,799 A * | 5/1974 | Taylor | ..................... | 174/68.3 |
| 3,837,608 A * | 9/1974 | Simon | ..................... | 248/313 |
| 4,040,549 A * | 8/1977 | Sadler | ..................... | 224/483 |
| 4,567,546 A * | 1/1986 | Zeller et al. | ............... | 361/810 |
| 4,910,362 A * | 3/1990 | Kinner | ..................... | 174/135 |
| 5,025,919 A * | 6/1991 | Brinker et al. | ............ | 206/214 |
| 5,178,354 A * | 1/1993 | Engvall | ..................... | 248/316.7 |
| 5,255,800 A * | 10/1993 | Kelly | ..................... | 211/89.01 |
| 5,259,519 A * | 11/1993 | Lieberman | ................ | 211/66 |
| 5,996,950 A * | 12/1999 | Richter | ..................... | 248/205.5 |
| 6,019,543 A * | 2/2000 | Junker | ..................... | 404/10 |
| 6,308,923 B1 * | 10/2001 | Howard | ..................... | 248/205.5 |
| 6,402,104 B1 * | 6/2002 | Smith | ..................... | 248/205.5 |
| 6,609,689 B1 * | 8/2003 | Knapp | ..................... | 248/205.5 |
| 2002/0125392 A1 * | 9/2002 | Zhadanov et al. | ......... | 248/313 |
| 2002/0175250 A1 * | 11/2002 | Lian | ..................... | 248/205.5 |

* cited by examiner

*Primary Examiner* — Bradley Duckworth
(74) *Attorney, Agent, or Firm* — Henry M. Feiereisen

(57) ABSTRACT

A device for supporting bathroom accessories and the like, comprising a suction cup element including a suction part and a holding part adapted to hold a bathroom accessory and the like, and a mounting element including an engaging formation formed to engage and retain the suction part of the suction element and member adapted to attach to a wall.

3 Claims, 2 Drawing Sheets

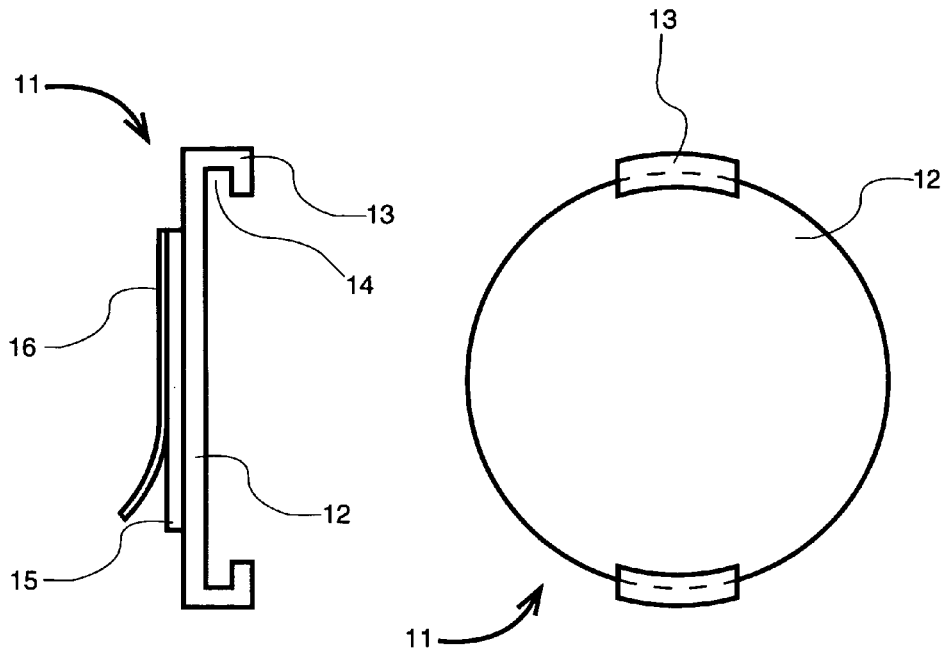
Fig. 3  Fig. 4
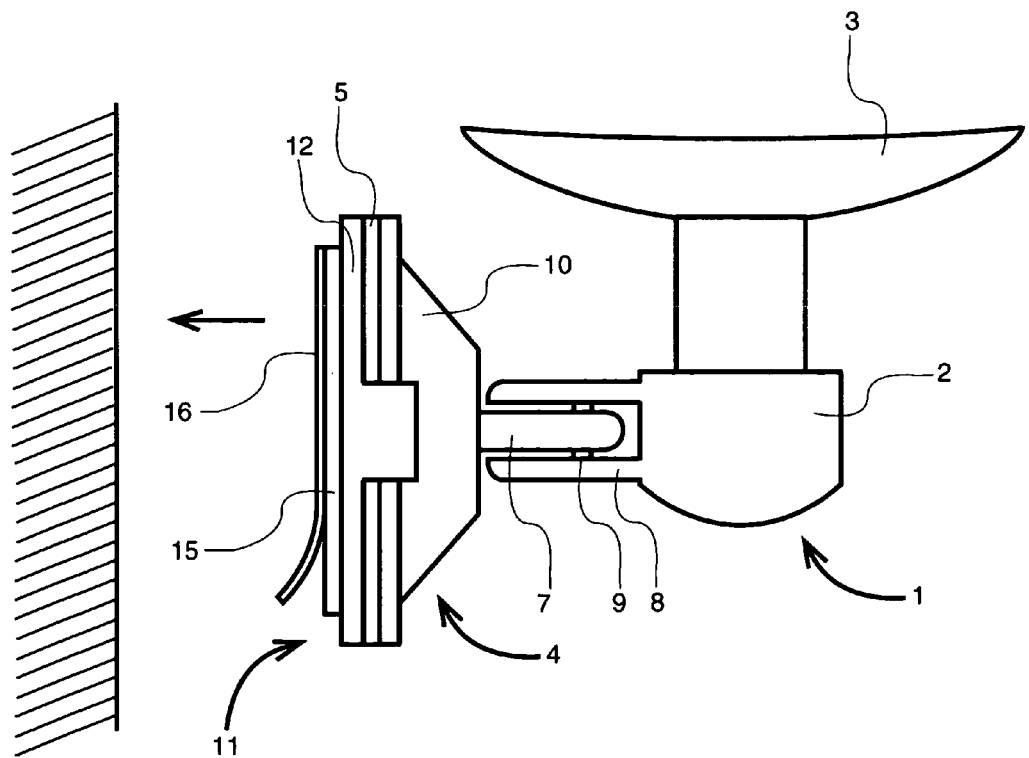
Fig. 5

DEVICE FOR SUPPORTING BATHROOM ACCESSORIES AND THE LIKE

BACKGROUND OF THE INVENTION

The present invention relates to a device for supporting bathroom accessories, such as for example towel bars, soap holders, hand showers, etc.

Devices of the above mentioned general type are known in the art. It is believed that the existing devices can be further improved.

SUMMARY OF THE INVENTION

Accordingly, it is an object of the present invention to provide a device for supporting bathroom accessories and the like which is a further improvement of the existing devices.

In keeping with these objects and with others which will become apparent hereinafter, one feature of the present invention resides, briefly stated, in a device for supporting bathroom accessories and the like, comprising a suction cup element including a suction part and a holding part adapted to hold a bathroom accessory and the like; and a mounting element including an engaging formation formed to engage and retain said suction part of said suction element and member adapted to attach to a wall.

When the device is designed in accordance with the present invention it constitutes a further improvement of the existing devices.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 3 and 4 are a side view and a front view of a mounting element of the inventive device; and FIG. 5 is a view showing the device after mounting.

DESCRIPTION OF THE PREFERRED EMBODIMENTS

Figure 1:
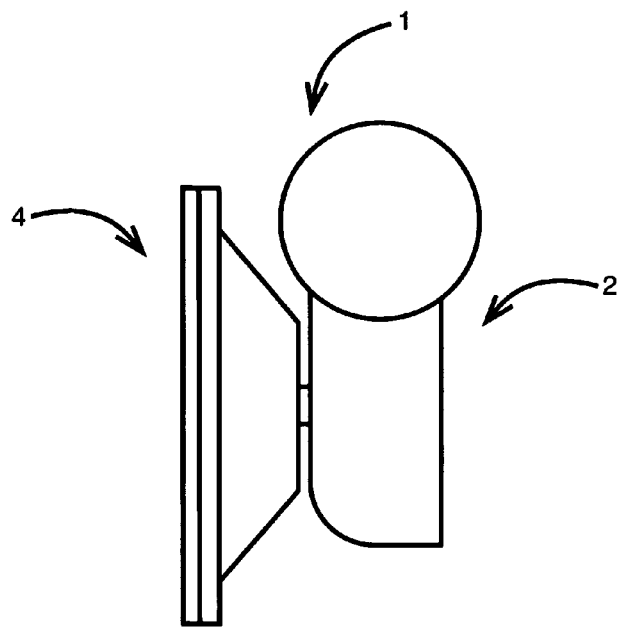
FIGS. 1 and 2 are views showing a suction cup element of the inventive device in inoperative and operative positions.

A device for supporting bathroom accessories and the like includes a suction element which is identified as a whole with reference numeral 1. The suction element has a holding part 2 which is provided for holding a bathroom accessories, such as for example a soap-holder 3, a not shown towel bar, etc.

The suction element further has a suction part which is identified as a reference numeral 4 and formed as known in the art. In particular, the suction part 4 can include a diaphragm 5 which is connected to a central disk 6 connected in turn to the projection 7. The holding part 2 has two legs 8 which surround the projection 7 and are turnably connected with it. The pivot axis 9 for pivoting the holding part relative to the suction part 4 is selected so that the when the holding part 2 is turned from an inoperative position shown in FIG. 1 in which the holding part 2 extends perpendicular to the axis of the suction part 4, into an operative position shown in FIG. 2 in which the holding part 2 is coaxial with the axis of the suction part 4, the legs 8 pull the projection 7 with the disk 6 and the diaphragm 5 inwardly and therefore create a suction under the diaphragm 5 which is arranged in a conical casing 10, thus creating suction.

The device further has a mounting element which is identified as a whole with reference numeral 11. The attaching element has a disk 12 provided with two projections 13 which form a groove 14 therebetween. At the opposite side the attaching element 11 has an adhesive layer 15 which is originally closed by a non adhesive covering member for example paper 16.

The device operates in the following manner:

The holding element 1 is first assembled with the attaching element 11 by sliding the casing 10 with the diaphragm 5 into a slot 14 between the projections 13 so that the holding element 1 is reliably held in the attaching element 11, for example by friction. Since the diaphragm 5 is compressible it compresses and provides a tight connection of the elements 1 and 11. The holding member 2 is turned from the position shown in FIG. 1 to the position shown in FIG. 2 so that a suction is generated in the suction member 4 and additionally reliably holds the holding part 11 in the attaching part 1. The protective layer 16 is removed, and the attaching element 1 is attached by the adhesive layer 15 to a wall and the like. In this position the device supports for example a soap-holder 3, for example in bathroom and the like, and for example, in a position near a sink and the like.

Figure 2:
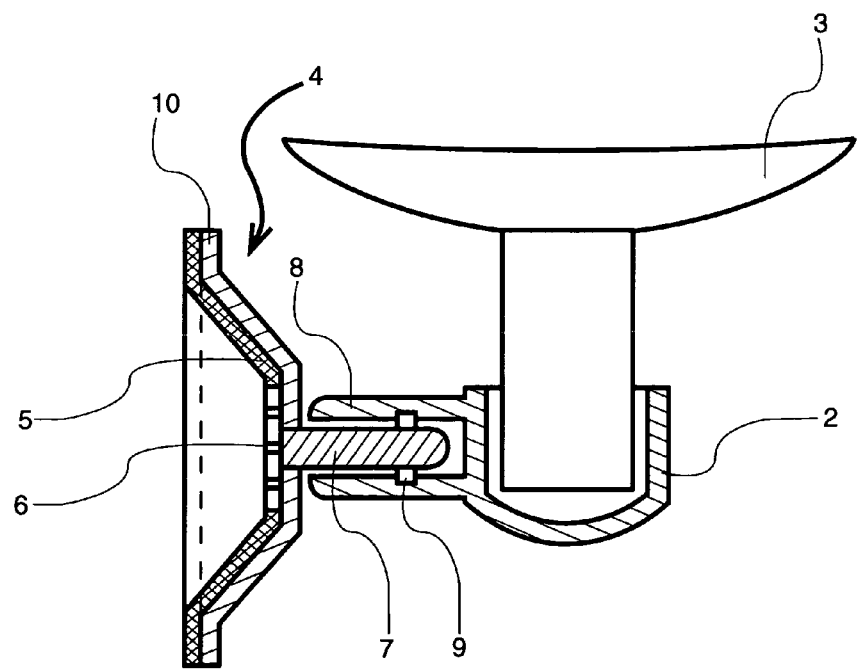

If however it is necessary to move a soap-holder to another location, for example for bathing a child in a bathtub or the like, the holding part 2 is turned relative to the suction part 4 from the position shown in FIG. 2 to the position shown in FIG. 1 so that a suction under the diaphragm 5 is removed, and then the holding element 1 is moved out from the gap 14 so that the holding element 1 is removed from the attaching element 11. Then the holding element 1 can be moved to another location, for example near the bathtub. The left side of the holding element 1 can be placed against the wall, and the holding member 2 is then turned from the position shown in FIG. 1 to the position shown in FIG. 2 so that the holding element 1 becomes attached to the wall and the like to support the soap-holder 3 at a location near the bathtub. Thus, in accordance with the present invention a bathroom accessory can be held with the device in one location, relatively permanently, and then when necessary its parts can be disassembled and the part of the device, in particular the holding element, can be moved to another location to support a bathroom accessory at the other location.

It will be understood that each of the elements described above, or two or more together, may also find a useful application in other types of constructions differing from the types described above.

While the invention has been illustrated and described as embodied in, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A device for supporting bathroom accessories, comprising a suction element including a suction part having an axis and a central disc, and a holding part adapted to hold a bathroom accessory; and a mounting element having one axial surface at one side as considered in an axial direction and on said one axial surface provided with an adhesive member attachable to a wall and another opposite axial surface at another opposite side as considered in the axial direction and provided in said another axial surface with a transverse groove extending transversely to said axis and into which said suction part and said central disc of said suction cup element are insertable transversely to said axis and held in said transverse groove, so that when said adhesive member on said one axial surface of said mounting element is attached to the wall and said suction part and said central disc of said suction element are received in said groove of said mounting element in said another axial surface of said mounting element, a bathroom accessory can be supported in said holding part of said suction cup element with said suction part and said central disc received and held in said transverse groove in said another axial surface of said mounting element, wherein said suction part and said central disc of said suction cup element are removable from said transverse groove in said another axial surface of said mounting element by moving transversely to said axis from said transverse groove and when it is removed, then said suction cup element is attachable without said mounting element to the wall directly by suction, wherein said groove is formed exclusively by two oppositely located projections spaced on said mounting element in a first direction transverse to said axis such that said suction part and said central disc of said suction cup element are slidable over said mounting element into said groove in a second direction transverse to said axis and transverse to said first direction to insert said suction part and said central disc into said groove of said mounting element, and said suction part and said central disc are slidable over said mounting element from said groove in a third direction opposite to said second direction and transverse to said axis and transverse to said first direction to remove said suction part and said central disc from said mounting element.

2. A device for supporting bathroom accessories as defined in claim 1, wherein said suction part includes a compressible diaphragm, said projections and said groove being formed so that when said suction part and said central disc are inserted in said groove said diaphragm is compressed so as to tightly hold said suction cup in said groove of said mounting element.

3. A device as defined in claim 1, wherein said adhesive member includes an adhesive layer and a protective layer which is removable for adhesively attaching said adhesive layer to the wall.

\* \* \* \* \*